(12) United States Patent
Fujiwara

(10) Patent No.: US 6,414,929 B1
(45) Date of Patent: Jul. 2, 2002

(54) DISK DEVICE WITH IMPROVED LOADING MECHANISM

(75) Inventor: Tatsunori Fujiwara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/554,732

(22) PCT Filed: Sep. 29, 1998

(86) PCT No.: PCT/JP98/04382

§ 371 (c)(1),
(2), (4) Date: May 19, 2000

(87) PCT Pub. No.: WO00/19424

PCT Pub. Date: Jun. 4, 2000

(51) Int. Cl.[7] .................................................. G11B 17/04
(52) U.S. Cl. ......................................................... 369/77.1
(58) Field of Search ................................ 369/77.1, 75.2; 360/99.02, 99.03, 99.06, 99.07

(56) References Cited

U.S. PATENT DOCUMENTS

| 5,031,169 A | * | 7/1991 | Kato et al. ................... 369/233 |
| 5,126,899 A | * | 6/1992 | Kanazawa ................... 360/96.5 |
| 5,748,596 A | * | 5/1998 | Nakamichi ............... 360/98.06 |

FOREIGN PATENT DOCUMENTS

| JP | 7-244912 | 9/1995 |
| JP | 2502657 | 4/1996 |
| JP | 8-111054 | 4/1996 |

* cited by examiner

Primary Examiner—Brian E. Miller
(74) Attorney, Agent, or Firm—Sughrue Mion, PLLC

(57) ABSTRACT

A flexible engagement section 58e is provided on a slider rack 58 in order to return a slider lock 70 to an initial position with a slider rack 58 when a disk D (ejection operation period) is being ejected from a turntable. The flexible engagement section 58e is pushed towards the slider lock and a cam section 2a is formed on the chassis which engages with the engagement section 70f of the slider lock 70.

2 Claims, 15 Drawing Sheets

DISK DEVICE WITH IMPROVED LOADING MECHANISM

FIELD OF THE INVENTION

The present invention relates to a disk device which loads two types (large and small) of disk onto a turntable of a playing unit (floating deck) and which expels (ejects) the disk from the turntable.

PRIOR ART

FIG. 1 is a schematic view of a disk device for use in a vehicle. In FIG. 1, reference numeral 1 denotes a disk device, 2 is a chassis (frame) which is disposed in a vehicle, 3 is a playing unit which rotates said turntable and reads information recorded on the disk D which is mounted on the turntable. 4 is a conveying unit which inserts the disk D from the disk insertion aperture formed in the chassis into the chassis, which conveys a disk to the turntable of the playing unit 3, which conveys a disk from the top of the turntable to the disk insertion aperture and which ejects the disk outside the chassis 2. 5 is a flexible member such as an oil damper which prevents the transmission of vibrations from the vehicle to the playing unit 3 when a disk D is being played and which is disposed between the chassis 2 and the playing unit 3.

In the playing unit 3, 11 is a playing unit base which stores a motor or the like for the purpose of driving the motor or pickup which rotates turntable. 11a is a rotation shaft of a pressuring arm (arm clamper) and is provided on the playing unit base 11. 12 is a turntable which rotates the mounted disk D and which is provided on the playing unit base 11. 13 is a pressuring arm which rotates about the rotational axis 11a, provided on the playing unit base, in the direction a–b.

14 is a disk clamp which grips the disk D with the turntable 12 by rotating the pressuring arm 13 towards the turntable 12 and which is mounted on the pressuring arm 13. 15 is a pickup which reads information recorded on the disk D and which is provided on the playing unit base 11.

In the conveying unit 4, 21 is a disk guiding section which is secured onto the upper plate of the chassis 2. 22 is a conveying roller which grips the disk D, which is inserted into the chassis 2 from the disk insertion aperture, with the disk guiding section 21, which conveys the disk D to the playing unit 3 by rotating in a positive direction while the disk D is gripped, which grips a disk which has been conveyed to the playing unit 3 with the disk guiding section 21 and which conveys a disk D to the disk insertion aperture by rotating in the reverse direction while the disk D is gripped and which ejects the disk D outside the chassis.

In FIG. 1, the pressuring arm 13 which is provided on the playing unit 3 and the conveying roller 22 which is provided on the conveying unit 4 are driven by sliding displacement in the direction of disk ejection and direction of disk insertion by a cam plate. The fixation and release of the playing unit 3 are also performed by a cam plate. These operations are not shown in the figures and their explanation will be omitted below.

The operation will now be explained.

Disk Loading

A disk D which is detected by a disk sensing switch (not shown) is gripped by the disk guiding section 21 and the conveying roller 22 and conveyed to the playing unit 3 by the rotations of the conveying roller 22. A disk D which has been conveyed to the playing unit 3 is gripped by the turntable 12, and the disk damp 14 due to the pressuring arm rotating towards the turntable 12 and loaded onto the turntable 12. At this time, the conveying roller 22 displaces to a position removed from the disk D due to a cam plate (not shown), the fixation of the playing unit base 11 (which had been fixed) is released. The playing unit base 11 is supported by the flexible member 5 and the information recorded on the disk D can be read. That is to say, the disk D is placed into a playable state.

Disk Playing

The playing of the disk D, which is mounted in a stationary position on the turntable 12, is initiated by the turntable 12 rotating. The information recorded on the disk D is read by the pickup 15. At this time, the vibrations of the vehicle are absorbed by the flexible member 5 and such vibrations are prevented from being transmitted to the playing unit 5.

Disk Ejection

When the playing of the disk D is finished, the ejection of the disk D is initiated when the disk D is gripped by the turntable 12 and the disk damp 14 when the disk D is in a stationary position on the turntable 12. The pressuring arm 13 rotates in a direction away from the turntable 12. The conveying roller 22 which had been in a position removed from the disk D displaces back to a position adjacent to the disk D and the disk D is gripped by the disk guiding section 21 and the conveying roller 22. The disk D is conveyed to the disk insertion aperture and ejected outside the chassis 2 by the rotations of the conveying roller 22. At this time, the playing unit base. 11 is fixed by a cam plate (not shown).

The structure and operation of the disk device for use in a vehicle was outlined above. However each component will now be explained in detail below.

FIG. 2 is a plan view showing the horizontal operation of the mechanism of loading the disk D onto a turntable (not shown in FIG. 2) and ejecting the disk from the turntable in a conventional disk device. FIG. 3 is a lateral view of the right side of FIG. 2. In FIG. 2 and FIG. 3, 31 is a lever open member which is supported in the chassis 2 by a rotation shaft 32. 33 is a rocker arm which engages long hole 33a with the pin 13e on the pressuring arm 13. An impelling force is provided by the springs 34 which are provided on both components.

35, 36 are a pair of lever stoppers one end of which is stacked and is pivotally supported by the shaft 37 provided on the pressuring arm 13. 38 is a lever rod. 39 is a slider rack (lever trigger).

Arc shaped long holes 13a, 13b, 13c, 13d are formed on the pressuring arm 13 on the left and right of the axis 37. Pins 35a, 35b provided on the lever stopper 35 engage with the long holes 13a, 13b, and pins 36a, 36b provided on the lever stopper 36 engage with the long holes 13c, 13d. A lever rod 38 above is mounted on the pin 36a and the pin 36b engages with the indentation 38a. 40 is a spring which is provided between the lever stoppers 35, 36 so that they are compressed towards each other. 41 is a spring which compresses one end of the lever rod 38 so that one end of the lever rod is normally pushed in an abutting direction with the slide rack 39. 14 is a disk damp which is mounted on the pressuring arm 13 so that it is positioned in the center of the chassis 2.

The operation will now be explained.

FIG. 4 shows a large diameter (12 cm) as loaded in the disk device. FIG. 5 shows the disk device immediately after the switching from the horizontal operation to the vertical operation due to the insertion of a disk D.

Firstly as shown in FIG. 4, when a disk D is inserted, the disk D is conveyed into the chassis 2 by a conveying roller (not shown). A pin 31a is pushed by the peripheral face of the disk D during the conveying process. The lever open member 31 is rotated in a clockwise direction about the rotation shaft 32, and the rocker arm 33 is displaced in the direction of the arrow a by the tip of the projection 31b.

Due to this displacement, since the engagement of the pin 35b with the engagement section 33b is released, the pins 35a, 35b displace along the long holes 13a, 13b and the pins 36a, 36b displace along the long holes 13c, 13d. This is due to the pins 35a, 36a, 36b being pushed by the disk D due to the continuation of the disk D insertion. Thus the lever stoppers 35, 36 rotate transversely about the axis 37.

When the disk D progresses further into the device and is inserted into the position as shown in FIG. 5, the disk D pushes the slider rack 39 in the direction of the arrow b by the lever rod 38 which is maximally rotated through the pin 38b. Thus switching from horizontal to vertical operations is completed.

FIG. 6 shows the vertical operation mechanism. In FIG. 6, 40 is a slider lock, 41 is a arm lock, 42 is a drive shaft which is supported in the chassis, 43, 44 are pinion gears and reduction gears which are mounted on the drive shaft 42, and 45 is a base flap which supports the conveying roller shaft 47 of the disk D.

The slider rack 39 is provided so as to be displaceable in parallel along the lateral plate of the chassis 2. A rack 39a is provided on the tip of the slider rack 39 and a return spring 46 is provided on the rear end. The slider lock 40 is integrated so as to be relatively displaceable with the slider rack 39 and comprises a rack 40a which is provided parallel to the rack 39a, a hole which has a wide diameter on one side and which performs the releasing and locking of the support shaft 3a of the playing unit 3 and an L-shaped cam groove 40c which rotates the arm lock 41. A cam 40d which displaces the pressuring arm 13 is provided on the lateral face. A base flap 45 is supported in the chassis 2 so that both ends are rotatable in the shaft 50. A projection 45b supports the conveying roller shaft 47 on the arm 45 and operates the slider lock 40 on the lateral face of the arm. 48 is a return spring of the base flap 45.

The operation of the vertical operation will now be explained.

When the slider rack 39 is pushed in the direction b of the arrow by the switching operation from the above horizontal operation to the vertical operation, the rack 39a of the slider rack 39 engages with the pinion gear 43 during rotation. The slider rack 39 then displaces in the same direction due to the driving force of the pinion gear 43.

The engaging section 39b of the slider rack abuts with the engaging section 40e of the slider lock 40 due to the displacement of the slider rack 39. Thus the slider lock 40 displaces together in the same direction. As a result, the rack 40a of the slider lock 40 engages with the pinion gear 43 and displaces thereafter due to the driving force of the pinion gear 43. The cam 40d of the slider lock 40 operates the cam (not shown) of the pressuring arm (arm clamper) 13 due to the displacement of the slider lock 40. The pressuring arm 13 rotates in the direction of sandwiching the disk D.

The pin 41a of the arm lock 41 is guided upwardly in the figure by the cam groove 40c due to the continuing displacement of the slider lock 40. The arm lock 41 is rotated about the shaft 41b and the lock of the shaft 3a of the playing unit (the floating deck) is released.

The cam section 30c of the tip of the slider rack 39 depresses the projection 45a, of the base flap 45 as shown in FIG. 7 due to the displacement of the slider rack 39. The base flap 45 rotates in a direction away from the disk D, that is to say, in the direction in which the conveying roller 47 moves away from the disk D. The slider lock 40 operates the disk storage (loading) completion switch (not shown) and disk storage is completed.

Disk Ejection

When the disk is ejected, the pinion gear 43 rotates in the opposite direction to when the disk is loaded and the slider rack 39 and the slider lock 40 displace in the direction d shown by the broken line. The base flap 45 rotates so that the conveying roller operates on the disk D, that is to say, on the disk side by the force of the return spring due to the displacement of the slider rack 39. Thus the gear 47a of the conveying roller shaft 47 engages with the reduction gears 44.

The arm lock 41 rotates to the position shown in FIG. 6 from the position shown in FIG. 7 due to the displacement of the slider lock 40 and locks the shaft 3a of the playing unit 3. The operation of the cam 40d of the slider lock 40 is released as the cam (not shown) of the pressuring arm 13 and the pressuring arm is rotated in the direction in which the pressuring arm moves away from the disk D.

When the engagement of the racks 39a, 40a of the slider rack 39 and the slider lock 40 with the pinion gear 43 is released, the slider rack 39 and the slider lock 40 return to a horizontal operational position from a vertical operational position and move the disk D vertically by the spring force of the respective return springs 46, 49.

In this way, when the disk D is moved horizontally, the loaded disk D is conveyed in the direction of ejection by the conveying roller 22 which is driven through the reduction gears 44 and the gears 47a. When the disk D displaces to a position shown in FIG. 4 from the position shown in FIG. 5, the peripheral edge of the disk pushes the pin 31a, the lever open member 31 is rotated in a clockwise direction and the rocker arm 33 is displaced in the direction a of the arrow by the projection 31b on the tip of the lever open member 31.

When the engagement of the pin 35b with the engagement section 33b is released by this displacement, the lever stoppers 35, 36 are rotated in a direction in which they approach each other due to the force of the spring 85 and return to the state as shown in FIG. 2 together with the ejection of the disk D. The lever open member 31 returns to an initial position due to the spring force of the return spring 31c when the disk D stops operating on the pin 31a. As a result, the rocker arm 33 also returns to an initial position as the lever open member 31 is in an initial position.

FIG. 8 shows the loaded position of a small diameter (8 cm) disk D. The small diameter disk D does not operate at all on the lever open member 31. As a result, the rocker arm 33 and the lever stoppers 35, 36 do not operate. The edge of the inserted disk D directly operates on the pin 38b of the lever rod 38 as shown in FIG. 8 and the lever rod 38 is rotated in a clockwise direction about the pin 36a through the pin 36b. The slider rack 39 is pushed in the direction of the arrow b by the lever rod 38 and the switching operation from horizontal to vertical operations is completed. Thereafter the vertical operation is performed as above and the disk loading is complete. Furthermore when the vertical and horizontal operations are performed in a manner opposite to that above, the disk ejection operation is complete.

Since in the conventional disk device, as shown above, the slider lock returns to an initial position due to the return spring during the ejection operation, it is sometimes the case that it does not completely return and the disk clamp can not be released. Therefore the problem arises that it is not possible to eject the disk D. Increasing the returning strength of the spring which returns the slider lock has been suggested as a solution to this problem. However as a result, a large force becomes necessary for the disk loading operation and thus the motor and drive force transmission parts must be increased in size which results in increased costs and size of the device. The present invention is proposed to solve the above problems and has the object of providing a disk device in which a return spring for the slider lock is not necessary, which eliminates the necessity for some components and which simplifies the structure of the device. The disk device of the present invention can accurately operate the locking of the playing unit and the release of the disk clamp. Furthermore according to the present invention, a return spring of the slider rack may be provided with a small spring force.

BRIEF SUMMARY OF THE INVENTION

The disk device of the present invention is provided with a slider rack which is driven on the completion of disk loading, a source of drive power which engages with the rack of the slider rack which drives a slider rack while accumulating a return force in a return spring, a slider lock wherein an engaging section of said slider rack engages with a first engaging section and is driven in the same direction by said slider rack, and wherein a rack engages with said source of driving power and said slider lock is driven together with said slider rack, an arm damper which rotates in the direction in which the disk D is sandwiched due to the displacement of the slider lock and which rotates in the direction in which the disk is released by the slider lock returning to an initial position, an arm lock which releases the lock of the playing unit due to the displacement of said slider lock and which locks the playing unit at the return to the initial position of the slider lock, and a base flap which displaces in the direction in which the conveying roller of the disk moves away from the disk due to the displacement of the slider rack and which abuts the conveying roller with the disk by the slider lock returning to an initial position. On returning to an initial position, the rack of the slider rack is in a configuration in which the engagement with the source of motive power continues even after the release of the engagement of the rack of the slider lock and the source of motive power. After the release of the engagement of the rack of the slider lock and the source of motive power, the flexible engaging section provided on the slider rack is pushed towards the slider lock and is engaged with the second engaging section of the slider lock. In addition a cam section is formed on the chassis which displaces the slider lock to its an initial position the slider rack above.

As a result of the above arrangement, it is possible to return the slider lock accurately to an initial position by engagement with the slider rack which is driven to an initial position by the source of motive power. It is also possible to accurately perform the locking operation of the playing unit which is controlled by the slider lock and the operation of releasing the disk damp. Furthermore the slider rack is continuously driven by the source of motive force even after the slider lock has returned to an initial position. Since the slider rack is released from the drive source after the flexible engagement section is separated from the engagement section of the slider lock, a small spring force may be used to return the slider rack to an initial position. However a return spring for the slider lock is not necessary and thus it is possible to simplify the structure and eliminate a number of components.

The disk device according to the present invention has a first engaging section on the slider lock which is formed in a flexible shape.

By such a construction, it is possible to reduce shocks when the engaging section of the slider rack engages and smoothly displace the slider rack and the slider lock.

DETAILED DESCRIPTION OF THE PREFERRED EMBODIMENTS

In order to explain the present invention in more detail, the preferred embodiments will be explained with reference to the accompanying figures.

Embodiment 1

Figure 1:
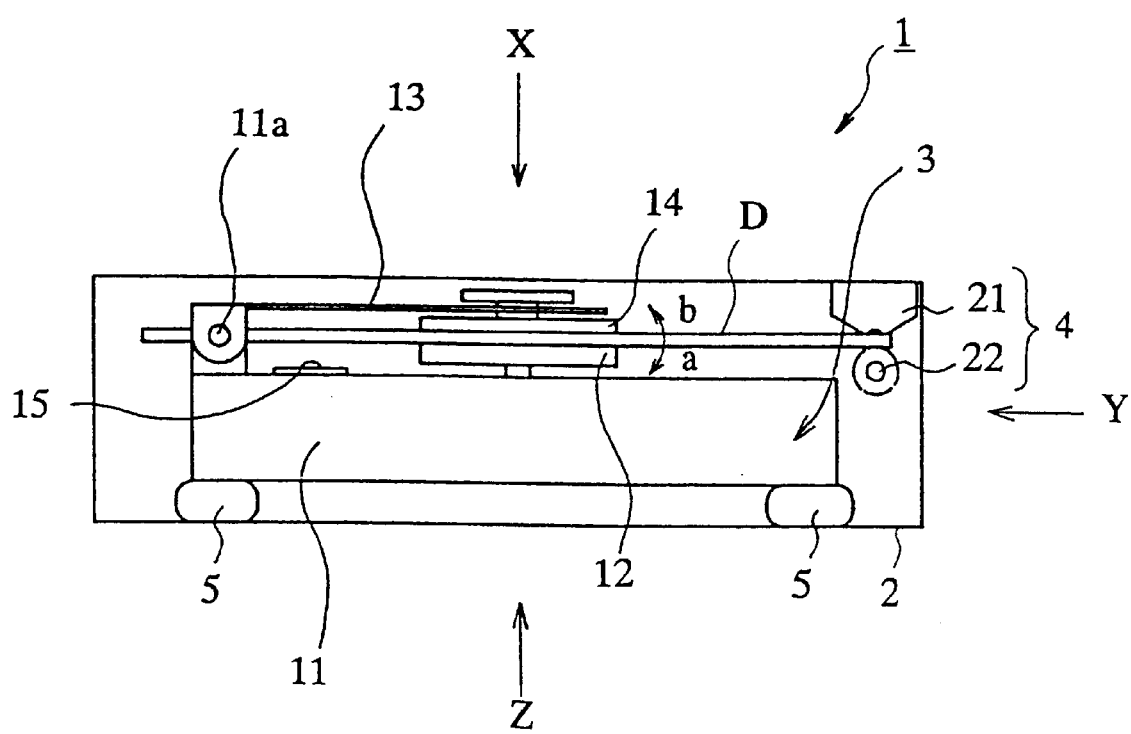
FIG. 1 is a schematic diagram of a disk device for use in a vehicle.
Figure 2:
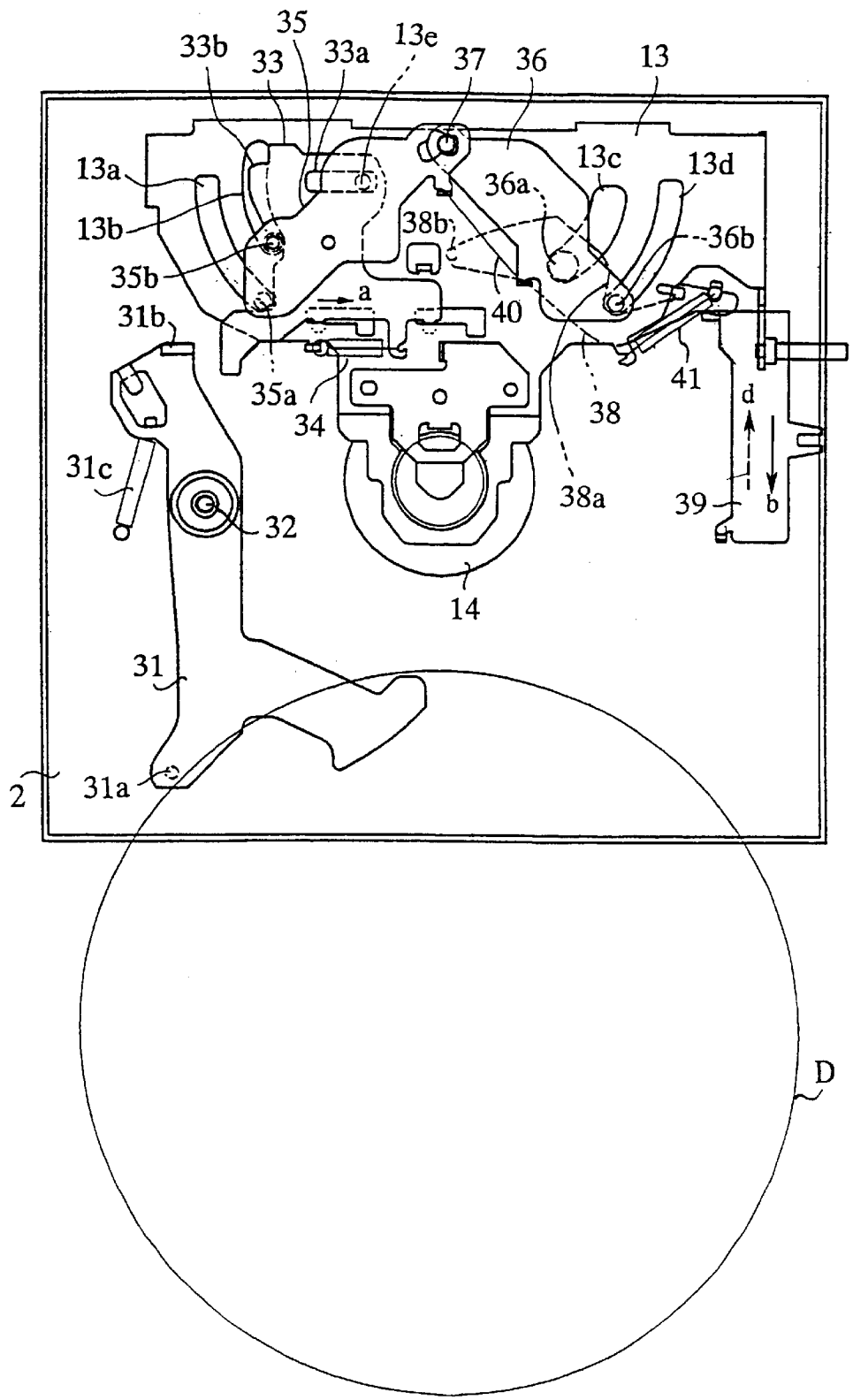
FIG. 2 is a is a plan view of the horizontal operation mechanism which loads a disk onto a turntable and ejects a disk from the turntable in a conventional disk device.
Figure 3:
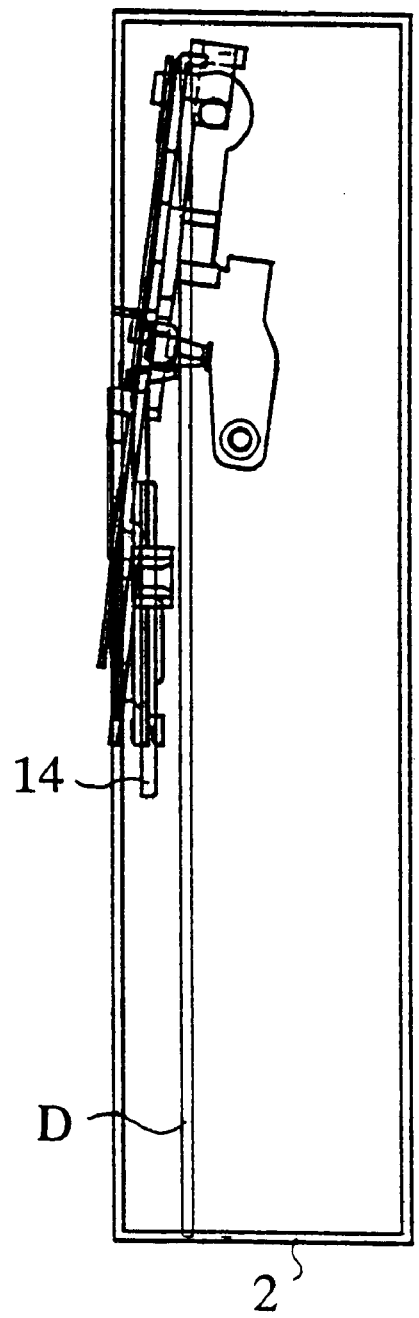
FIG. 3 is a right-side lateral view of FIG. 2.
Figure 4:
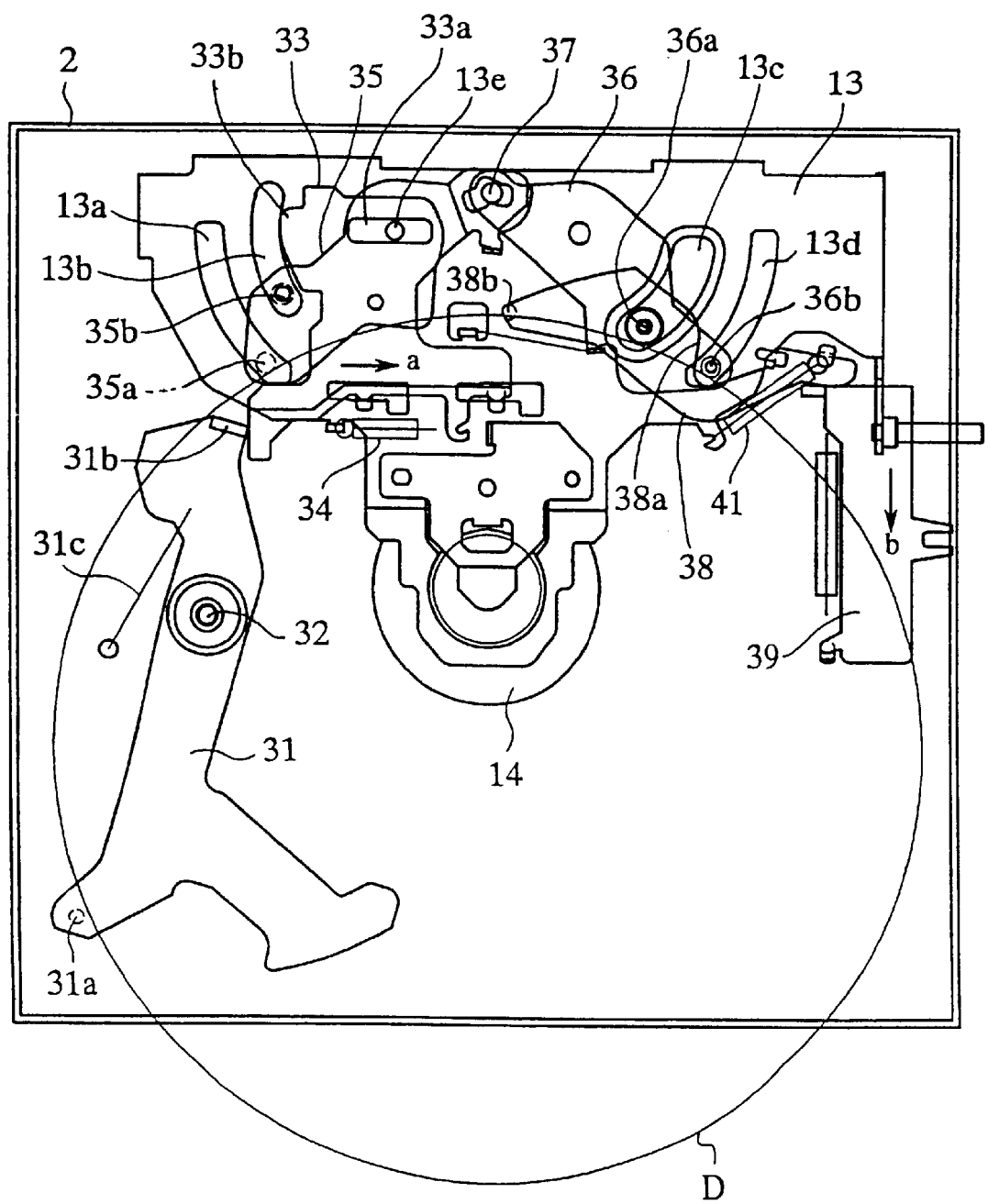
FIG. 4 is a plan view of the horizontal operational mechanism when a large diameter disk is loaded.
Figure 5:
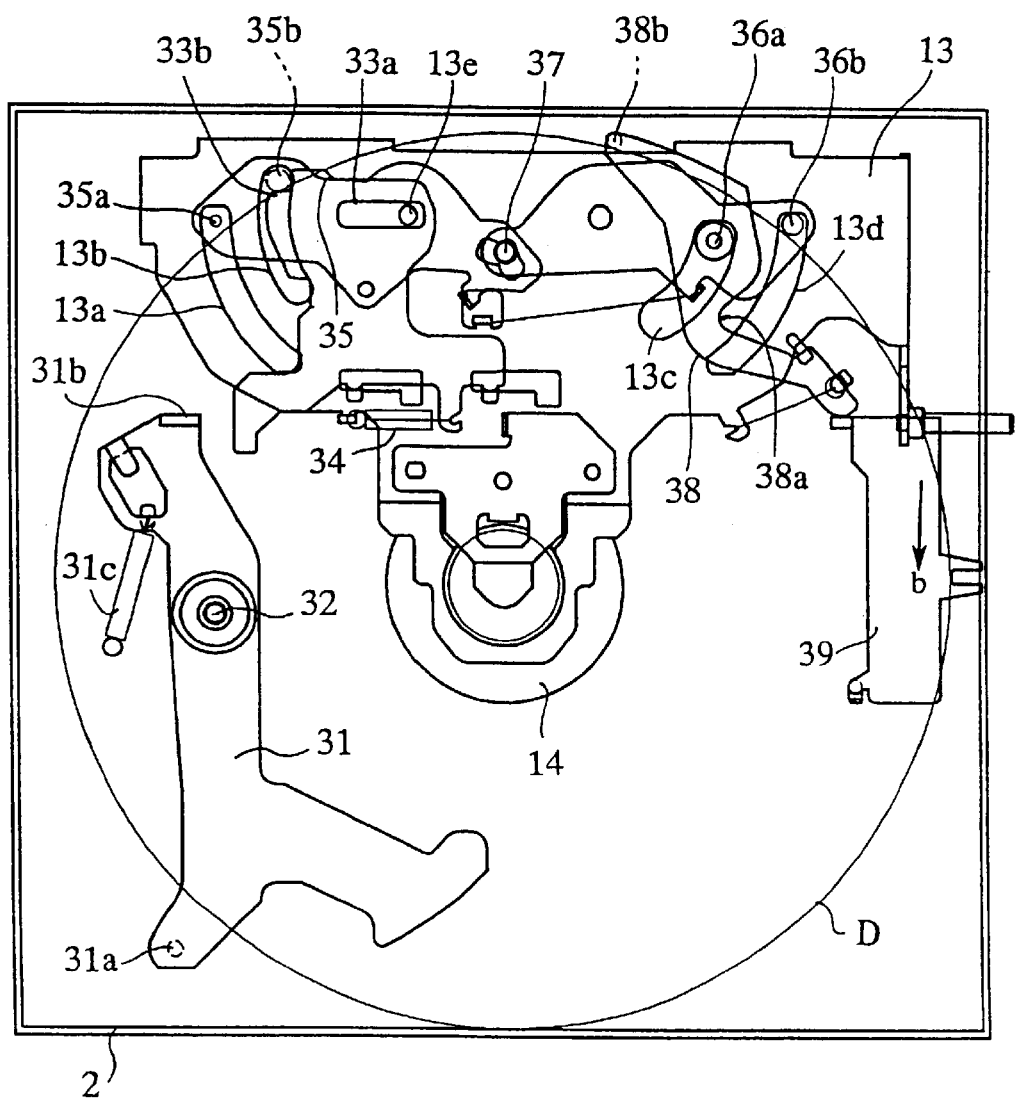
FIG. 5 shows the situation immediately after the switching operation due to insertion of a disk.
Figure 6:
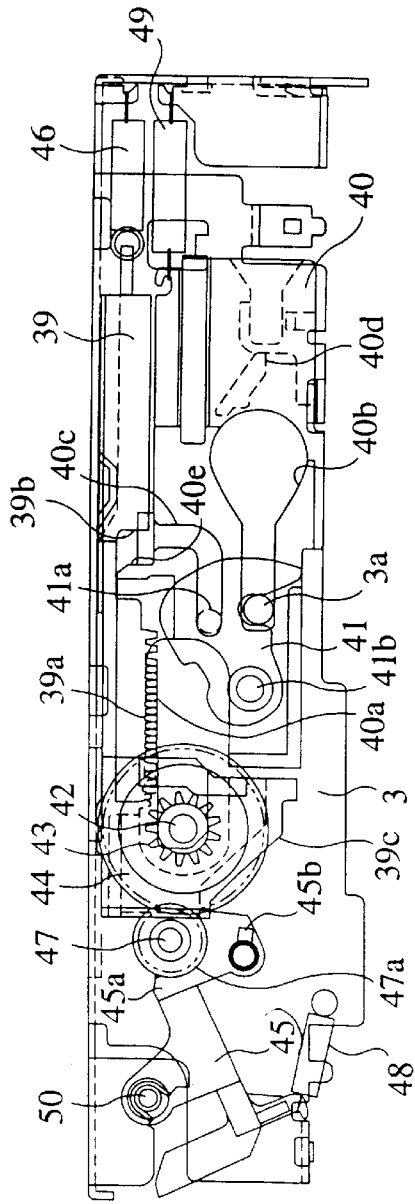
FIG. 6 is a front view of the vertical mechanism operation when switching from horizontal to vertical operations.
Figure 7:
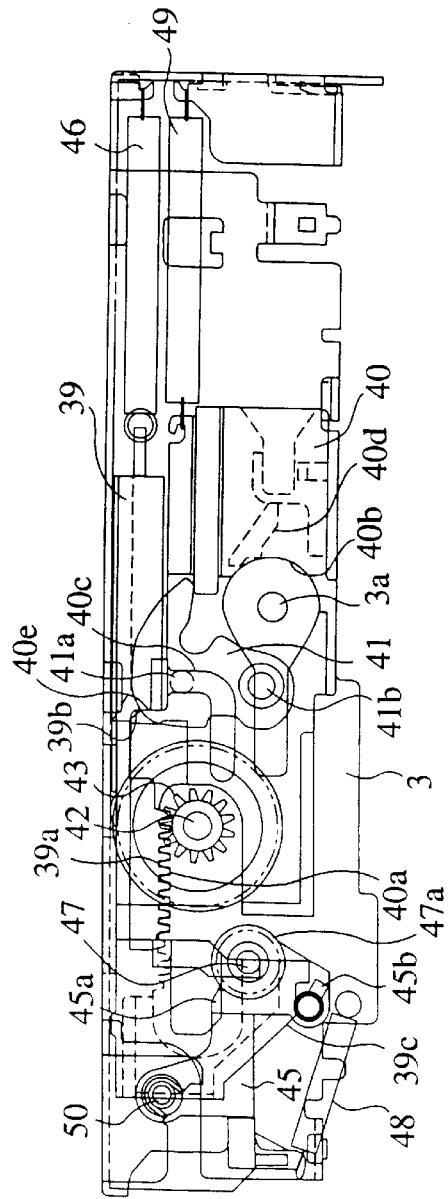
FIG. 7 is a front view of the vertical mechanism operation when disk loading is complete.
Figure 8:
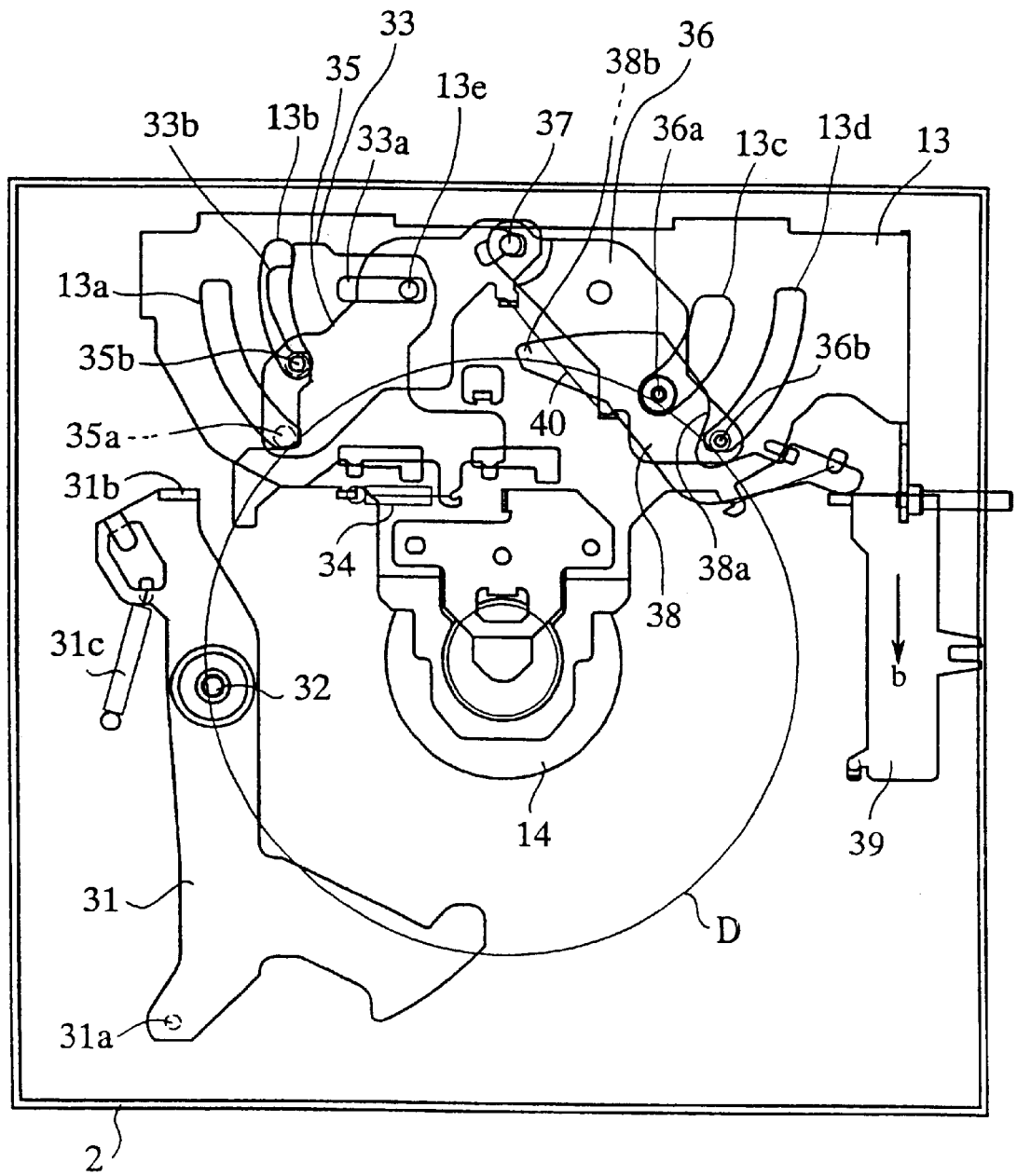
FIG. 8 is a plan view of the horizontal mechanism operation when a small diameter disk is loaded.
Figure 9:
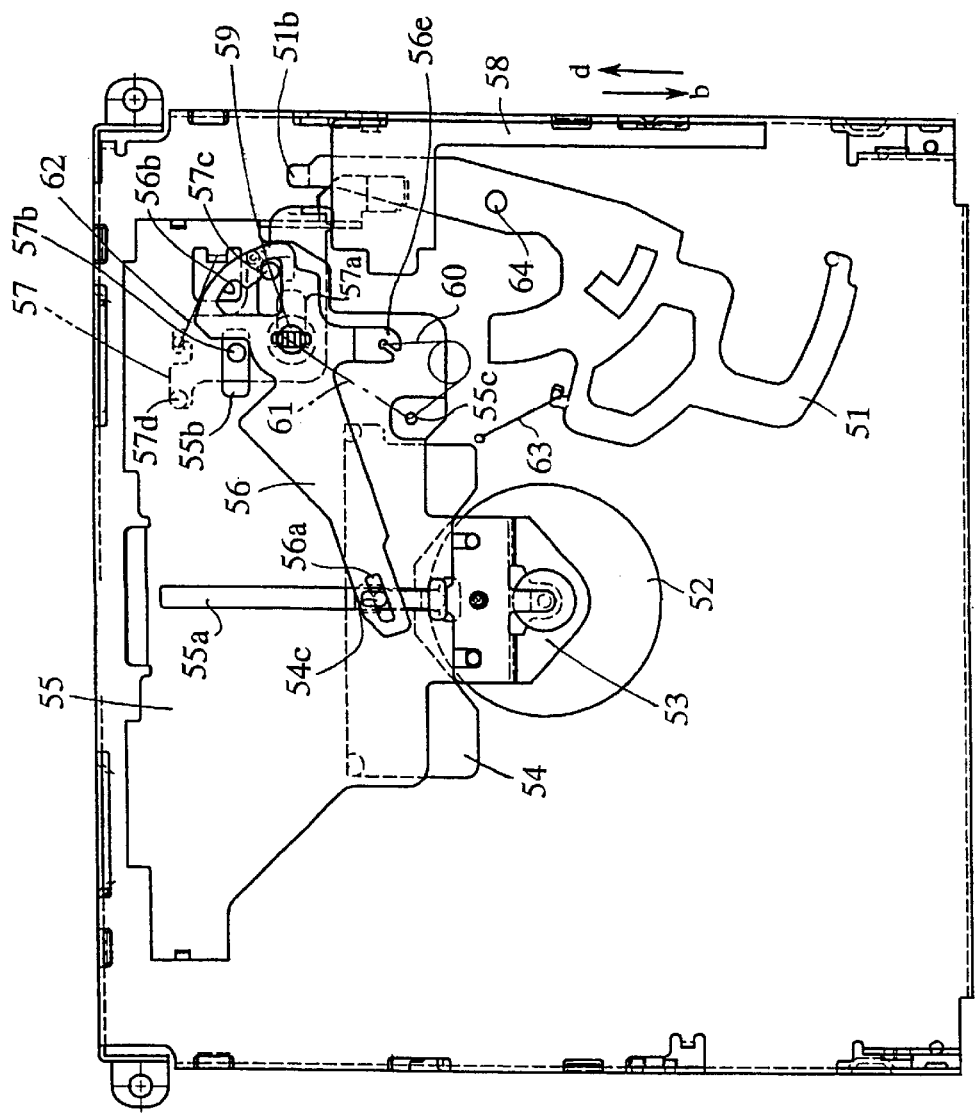
FIG. 9 is a plan view of the horizontal mechanism operation which loads the disk on to the turntable and which ejects the disk from the turntable in a disk device according to a first embodiment of the present invention.

FIG. 9 is a plan view of the horizontal operational mechanism which loads the disk on to the turntable and which ejects the disk from the turntable in a disk device according to a first embodiment of the present invention. In FIG. 9, 51 is a lever open member, 52 is a clamp, 53 is a clamp cap which mounts the clamp 52, 54 is a slider stop, 55 is a arm clamper, 56 is a lever stopper, 57 is a cam stopper, 58 is a slider rack, 59 is a hook stopper.

The central section of the lever open member 51 above is supported by a shaft by the chassis so as to be freely rotatable. A pin 51a is provided on one end which abuts with the disk edge and a projection 51b is provided on the other end. The slider stopper 54 has pins 54a, 54a on both left and right end corners with which the disk D abuts. The slider stopper is supported so as to be freely displaceable along the long hole 55a, which is provided in the direction of disk ejection in the arm damper 55 by the engaging section 54c provided in the center. The lever stopper 56 and the cam stopper 57 are supported in relative rotation by the hook stopper 59. The lever stopper 56 is engaged with the engaging section 54c of the slider stopper 54 by the long hole 56a which is provided at one end.

On one face of the cam stopper 57, apart from the long hole 57 which passes through the hook stopper 59, a pin 57b is provided which engages with the engaging hole 55b of the arm damper 55. In addition a pin 57c is provided which engages with the engaging hole 56b of the lever stopper 56. On the another face of the cam stopper 57, there is a pin 57d which abuts with the disk D. 60 is a. spring which is provided between the arm damper 55 and the cam stopper 57. The direction in which the spring 60 is compressed with respect to the cam stopper 57 is reversed by the cam stopper 57 rotating, and the mounting point 56e of the spring 60 exceeding the line 61 connecting the mounting point 55c of the spring 60 of the arm damper 55 and the hook stopper 59. 62 is a spring provided between the arm damper 55 and the cam stopper 57 so that a rotational force in a clockwise direction is given to the cam stopper 57.

The operation of the invention will be explained below.

Figure 10:
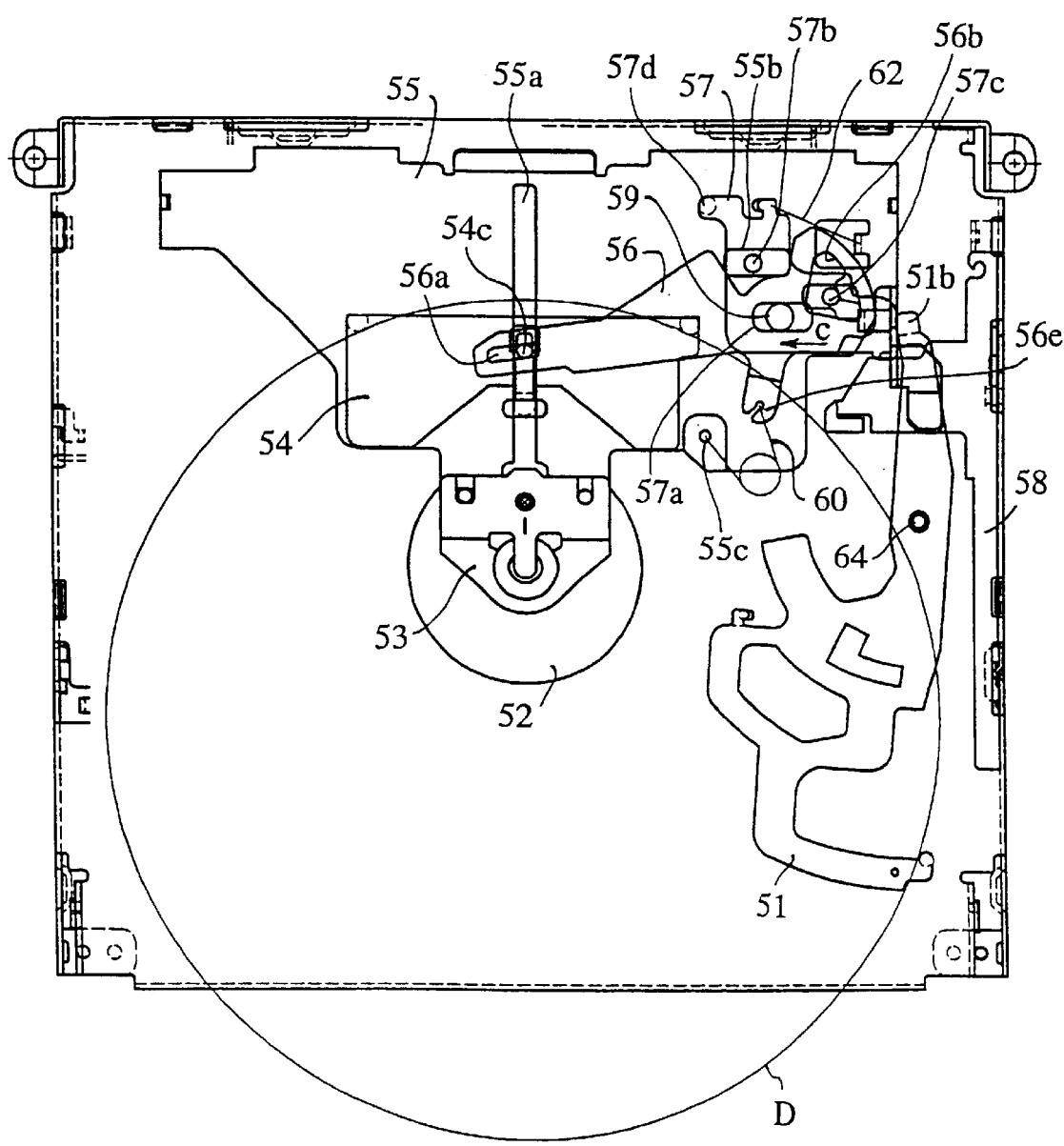
FIG. 10 is a plan view of a horizontal operational mechanism when a large diameter disk is loaded.
Figure 11:
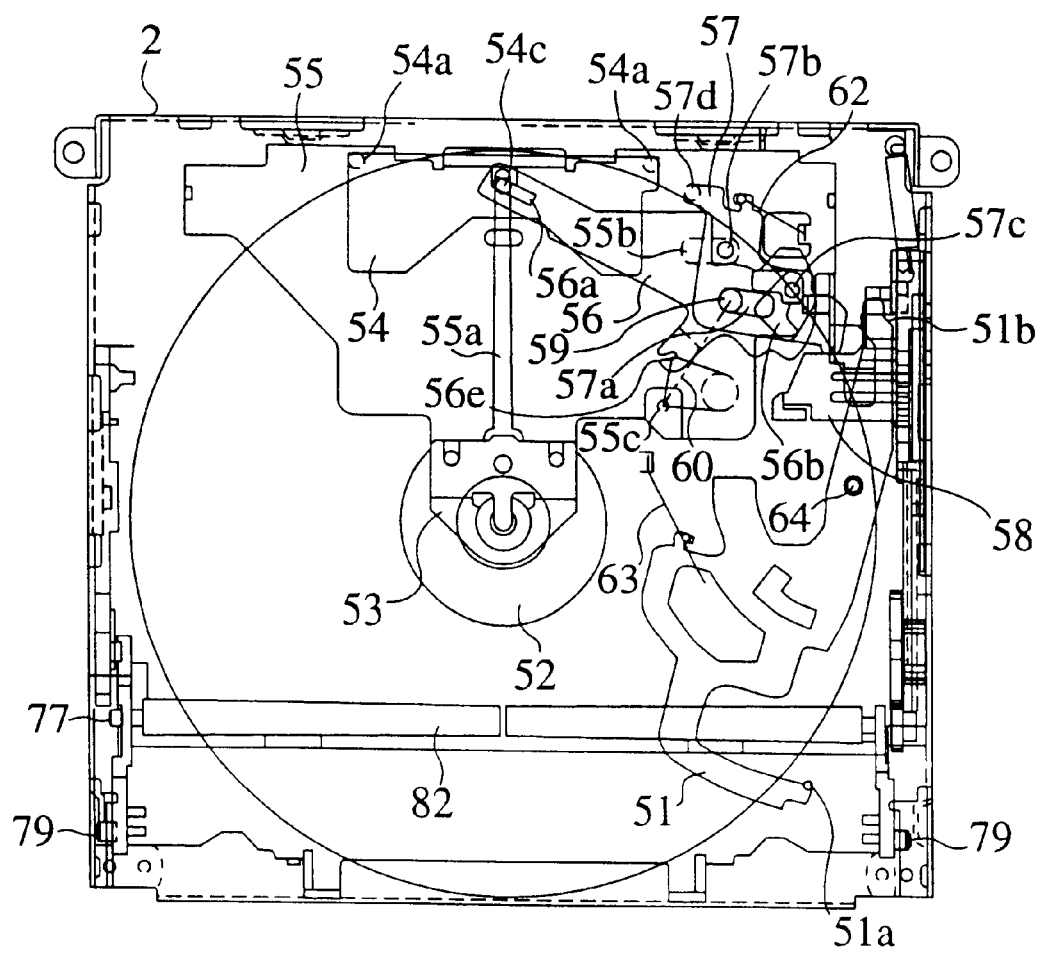
FIG. 11 is a view of the situation immediately after the switching operation due to the insertion of a disk.
Figure 12:
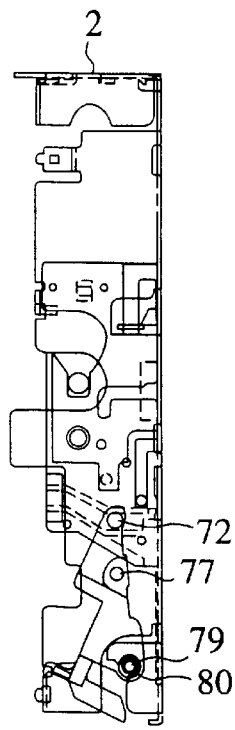
FIG. 12 is a left-hand lateral view of FIG. 11.
Figure 13:
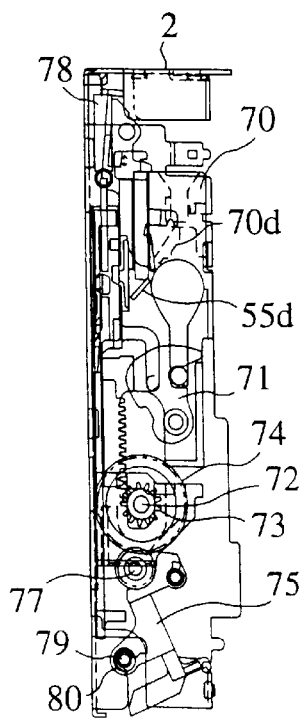
FIG. 13 is a right-hand lateral view of FIG. 11.

FIG. 10 shows a large diameter (12 cm) disk as loaded. FIG. 11 is a view of the situation immediately after the switching operation due to the insertion of a disk. FIG. 12 is a left-hand lateral view of FIG. 11. FIG. 13 is a right-hand lateral view.

Firstly as shown in FIG. 10, when a disk D is inserted, the pin 51a is pushed by the edge of the disk D, the lever open member 51 is rotated in an anti-clockwise direction, and the cam stopper 57 is displaced in the direction c of the arrow by the projection 51b on the tip of the lever open member 51. As a result of this displacement, the engagement of the pin 57c in the cam stopper 57 and the engaging hole wall of the lever stopper 56 is released and the slider stop 54 is displaced in the direction of disk D loading by being pushed by the disk D. Even if the lever stop 56 rotates, that rotational force is not transmitted to the cam stopper 57. As a result, as shown in FIG. 11, the disk D is loaded up to a fixed position, and presses directly on the pin 57d. Thus due to the fact that the cam stopper 57 is rotated, the slider rack 58 is pushed in the direction b of the arrow by the rotated cam stopper 57 and the switching operation from horizontal to vertical operations is completed.

Figure 14:
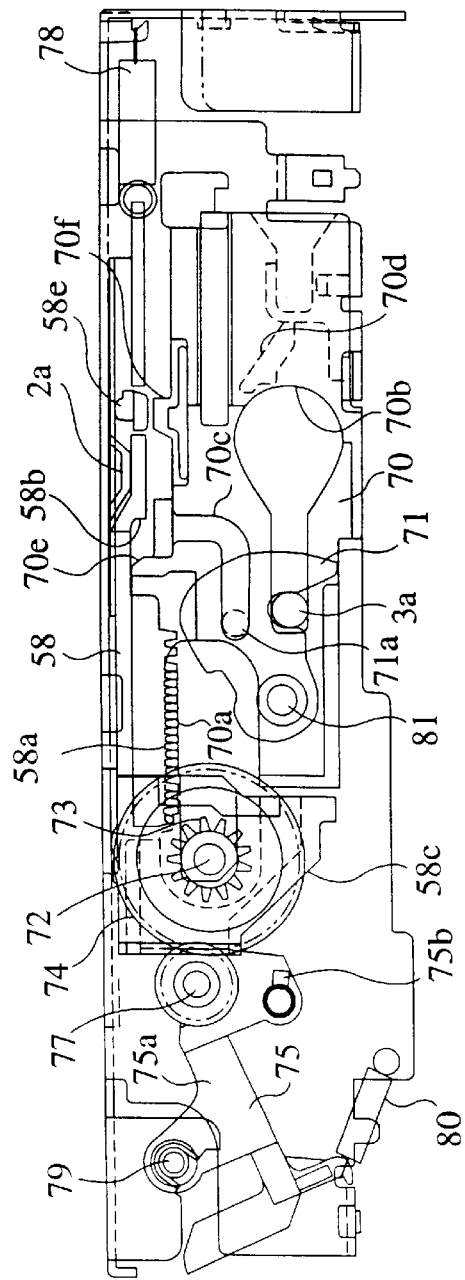
FIG. 14 is a front view of the vertical mechanism operation during the switching operation.

FIG. 14 is a view of the vertical operational mechanism. In FIG. 14, 70 is a slider lock, 71 is a arm lock, 72 is a drive shaft which is supported in the chassis 2, 73, 74 are pinion gears and reduction gears which are mounted on the drive shaft 72, and 75 is base flap which supports the conveying roller 77 of the disk D.

Figure 18:
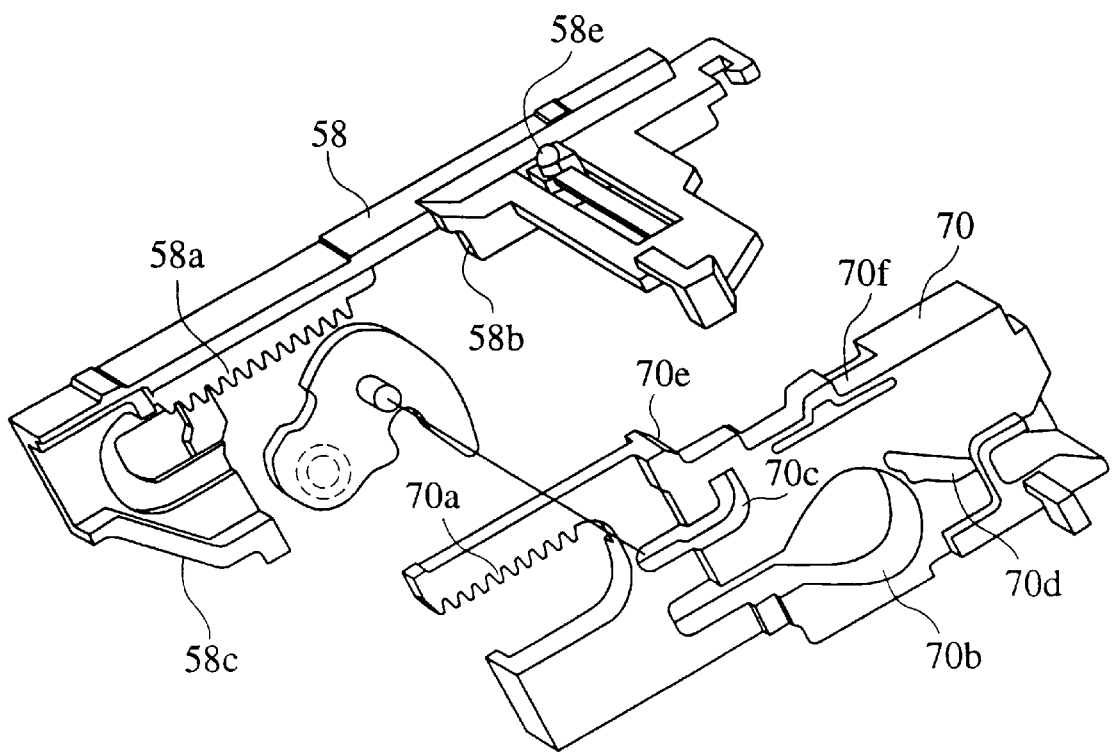
FIG. 18 is an exploded perspective view of the vertical mechanism operation.

As shown by the exploded perspective view in FIG. 18, the slider rack 58 above is provided so as to be displaceable in parallel along the lateral plate of the chassis 2. A rack 58a is provided on the distal end and a return spring 78 on the rear end. In addition, the slider rack 58 has an engaging section 58b, an engaging section 58c and a flexible engaging section 58e which is provided on the arm 58d which projects laterally. The slider lock 70 is integrated with the slider lock 58 so as to be relatively displaceable. The slider lock 70 has a rack 70a provided in parallel with the rack 58a, a hole 70b, one side of which has a large diameter which locks and releases the support shaft of the playing unit, and an L-shaped cam groove 70c which rotates the arm lock 71. On the lateral face of the slider lock 70, there is cam 70d which displaces an arm damper 55. On the upper face, there is a flexible engagement section 70e which operates on the engagement section 58b of the slider rack 58 and an engagement section 70f which operates on the flexible engagement section 58e of the slider rack 58.

Both ends of the base flap 75 are supported in the chassis 2 in a freely rotatable state by the shaft 79. An engaging section 75b which supports the conveying roller shaft 77 with the arm 75a, and which operates on the engaging section 58c of the slider rack 58 on the lateral face of the arm is provided. 80 is a return spring of the base flap 75.

The operation of the vertical operation will be explained below.

When the slider rack 58 is pushed in direction b by the switching from a horizontal operation to a vertical operation as explained above, the rack 58a of the slider rack 58 engages with the pinion gear 74 during. rotation. The slider rack 58 displaces in the same direction due to the drive force of the pinion gear 73.

While the slider rack 58 is displacing, the engaging section 58b of the slider rack abuts with the flexible engaging section 70e of the slider lock 70 and displaces together with the slider lock 70. As a result, the rack 70a of the slider lock 70 also engages with the pinion gear 73 and thereafter displaces by the drive force of the pinion gear 73. The cam 70d of the slider lock 70 operates on the cam 55d of the arm damper 55 FIG. 13) due to the displacement of the slider lock 70. Thus the arm damper 55 rotates in the direction in which the disk is sandwiched.

Figure 16:
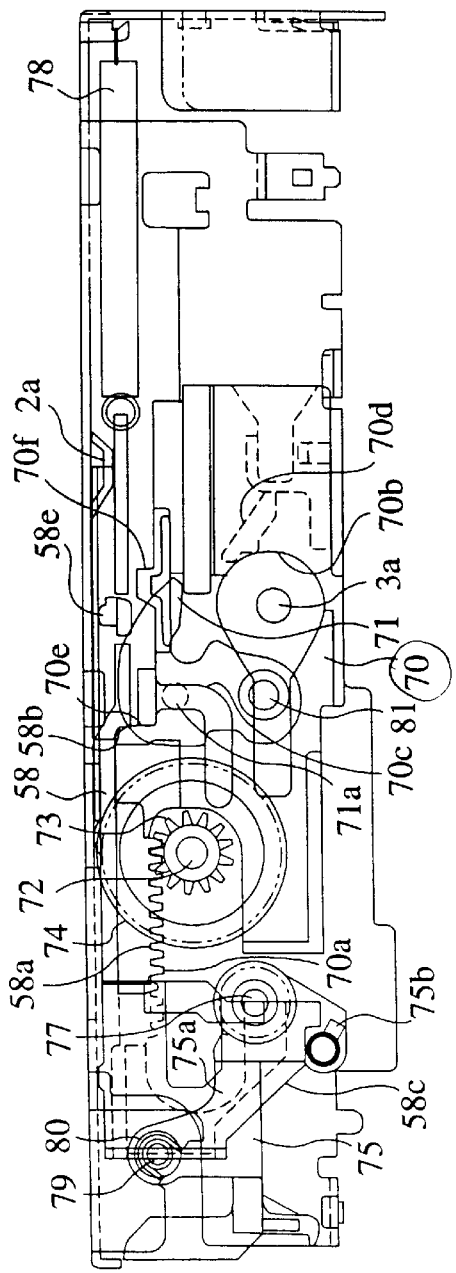
FIG. 16 is a front view of the vertical mechanism operation at completion of disk loading.

The pin 71a of the arm lock 71 is guided upwardly by the L-shaped cam groove 70c due to the continuing displacement of the slider lock 70. The arm lock 71 is rotated about the shaft 81 and as shown in FIG. 16, the lock of the support shaft of the playing unit (floating deck) is released.

On the other hand, when the engaging section 58c of the tip of the slider rack 58 depresses the -engaging section 75b of the base flap 75 due to the displacement of the slider rack 39, the base flap 75 rotates in a direction away from the disk D, that is to say, in a direction in which the conveying roller 82 displaces away from the disk D. Subsequently the disk loading procedure is completed when the slider lock 70 operates the disk loading completion switch (not shown).

Disk Ejection

When a disk is ejected, the pinion gear 73 rotates in an opposite direction to that when the disk device is loaded and the slider rack 58 and the slider lock 70 displace in the direction d of the arrow. Due to the displacement of the slider rack 58, the base flap 75 rotates so as to operate on the side of the disk with the force of the return spring 80, that is to say, so that the conveying roller 82 operates on the disk D. Furthermore the arm lock 71 rotates from the position in FIG. 16 to the position in FIG. 15 due to the displacement of the slider lock 70. The shaft 3a of the playing unit 3 is locked and the operation of the cam 70d of the slider lock 70 with respect to the cam 55d of the arm damper is released and the arm damper 55 rotates in a direction in which it separates from the disk.

Figure 17:
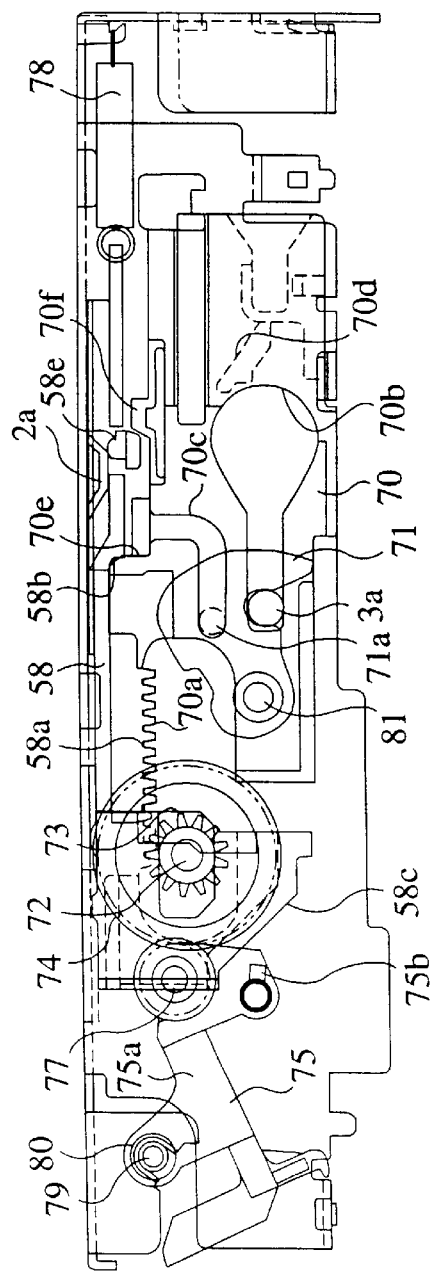
FIG. 17 is a front view of the vertical mechanism operation during its operation in the direction of disk ejection.

When the engagement of the rack 70a of the slider lock 70 with the pinion gear 73 is released, as shown in FIG. 17, the flexible engaging section 58e of the slider rack 58 is pushed outwardly towards the slider lock 70 by the cam section 2a of the chassis 2 and engages with the engaging section 70f of the slider lock 70. Thus the slider lock 70 is displaced to an initial position (position of ejection). When the slider lock 70 has returned to an initial position, the cam section 2a on the chassis with respect to the flexible engagement section 58e is no longer necessary. The flexible engagement section 58e of the slider rack 58 returns towards chassis and the engagement with the slider lock 70 is released. Thereafter the engagement of the rack 58a of the slider rack 58 and the pinion gear 73 is released, the slider rack 58 returns to an eject position due to the spring force of the return spring 78 and the switching from vertical to horizontal operations is completed.

As shown above, when moving to horizontal operations, the loaded disk D is conveyed in an ejecting direction by the conveying roller 82. As shown in FIG. 10, when the disk D moves in an ejecting direction, the edge of the disk D pushes the pin 51a and rotates the lever open member 51 in an anti-clockwise direction. Thus the cam stopper 57 is moved in direction c of the arrow by the projection on the tip of the lever open member 51. As a result of this movement, the engagement of the pin 57a of the cam stopper 57 and the edge of the engagement hole 56b of the lever stopper 56 is released. The slider stop 54 follows the movement in the direction of ejection of the disk due to the force of the spring 60. The lever stopper 56 also rotates and returns to an initial position as shown in FIG. 9.

Figure 19:
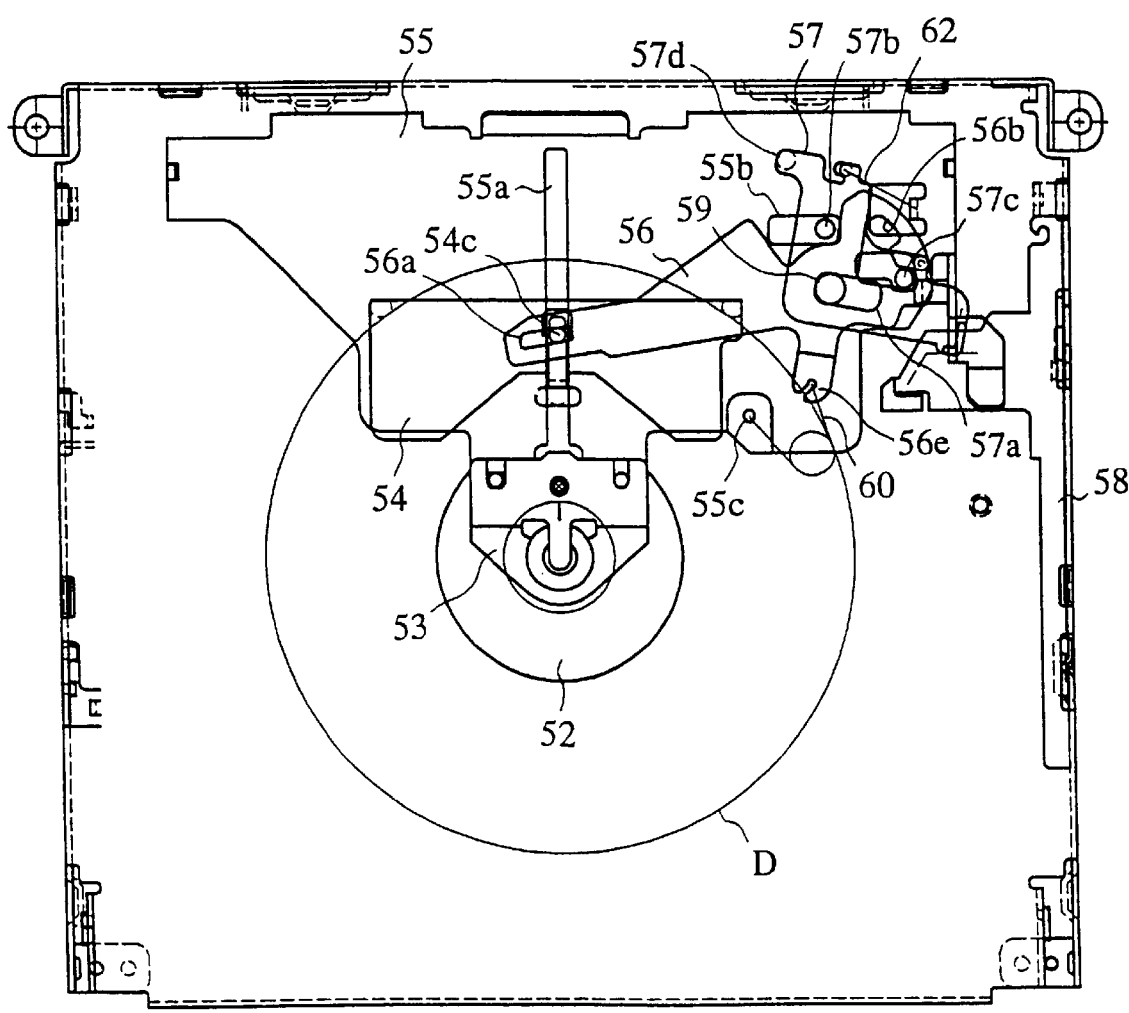
FIG. 19 is a plan view of the horizontal mechanism operation when a small diameter disk is loaded.

FIG. 19 shows the switching operation of loading a small diameter (8 cm) disk D. The small diameter disk D does not operate at all on the lever open member 51 during insertion or ejection and so the engaged position of the pin 57a of the cam stopper 57 and the edge of the engagement hole 56b of the lever stopper 56 is maintained. In this state, the pins 54a, 54a of the slider stopper 54 are pushed by the disk as the disk D is loaded and move in a loading direction. The lever stopper 56 is rotated in a clockwise direction by this movement and engages with the lever stopper 56. The slider rack 58 is pushed to a fixed position by the cam stopper 57 which is rotating together and the switching operation from horizontal to vertical operations is completed.

Figure 15:
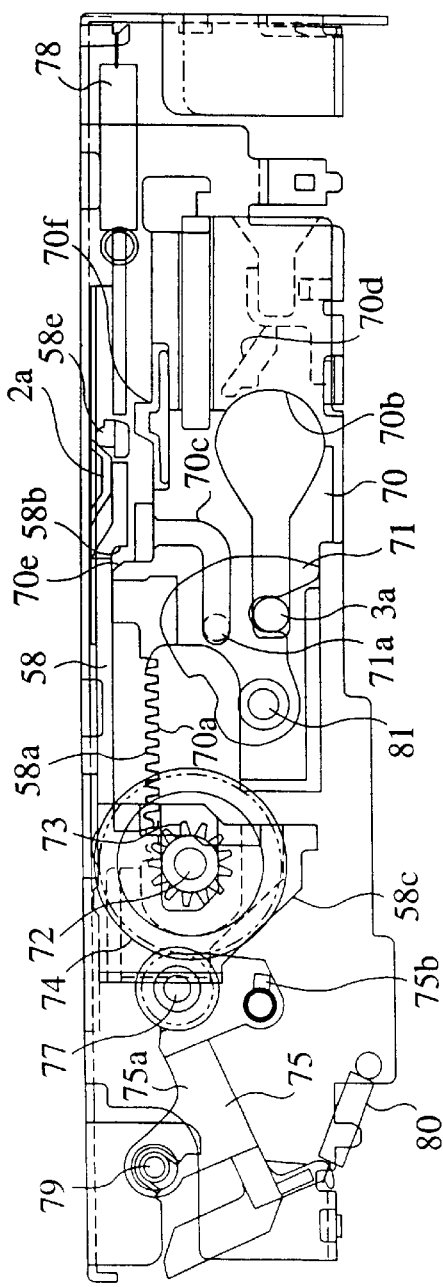
FIG. 15 is a front view of the vertical mechanism operation during its operation.

Disk loading is completed by the vertical operations of FIGS. 14–16. Furthermore since the ejection of a disk is performed by the operations shown in FIGS. 11 through FIG. 9 and FIG. 17, it is the same as that described above and will not be explained again here.

As shown above according to Embodiment 1, it is possible for the slider lock to accurately return to an initial position due to the engagement of a slider rack, which is driven by a motive source from a disk loading position to an initial position. Thus a return spring for the slider lock becomes unnecessary. The number of components and costs are also reduced. Furthermore it is possible to accurately perform the release operation of the disk damp and the locking operation of the playing unit which is controlled by the slider lock by returning the slider lock to an initial position. Furthermore since the slider rack continues to be driven by the source of motive power even after the slider lock has returned to an initial position, and is released from the source of motive power after the engagement with the slider lock is released, the spring force which returns the slider rack to an initial position need only be small.

Furthermore since the first engaging section of the slider lock is flexible, when the engagement section of the slider rack is engaged, it is possible to reduce shocks and smoothly displace the slider rack and slider lock.

Industrial Applicability

As shown above, the disk device of the present invention is adapted for use as a disk device for use in a vehicle which can employ disks of two varying sizes.

What is claimed is:

1. A disk device comprising:
    a slider rack which is driven upon completion of disk loading,
    a source of drive power which engages with said slider rack and which drives said slider rack while accumulating a return force in a return spring,
    a slider lock having a first engaging section, wherein an engaging section of said slider rack engages with the first engaging section so that said slider lock is driven by said slider rack so as to engage with said source of drive power so as to be driven together with said slider rack,
    an arm damper which rotates in a first direction in which the disk D is sandwiched due to the displacement of said slider lock and which rotates in a second direction in which the disk is released at the return to an initial position by said slider lock,
    an arm lock, which releases and locks a playing unit due to the displacement of said slider lock, wherein said arm lock locks the playing unit at the slider lock's return to an initial position, and
    a base flap which displaces in a third direction such that a disk conveying roller attached thereto moves away form the disk due to the displacement of said slider rack, wherein when said base flap moves in a direction opposite said third direction, said disk conveying roller abuts with the disk on the return to an initial position by said slider rack and
    wherein said slider rack, on returning to an initial position, is in a configuration in which the engagement with said source of drive power is continued even after the release of the engagement between the slider lock and the source of drive power, and
    further wherein after the release of the engagement between said slider lock and said source of drive power, a flexible engaging section provided on said slider rack is pushed towards said slider lock and is engaged with a second engaging section of said slider lock, and further wherein a cam section on a chassis displaces said slider lock to an initial position with said slider rack.

2. A disk device according to claim 1 wherein said first engagement section of said slider lock is formed in a flexible shape.

* * * * *

UNITED STATES PATENT AND TRADEMARK OFFICE
CERTIFICATE OF CORRECTION

PATENT NO.    : 6,414,929 B1
DATED         : July 2, 2002
INVENTOR(S)   : Tatsunori Fujiwara It is certified that error appears in the above-identified patent and that said Letters Patent is hereby corrected as shown below:

Title page,
Item [87], PCT Pub. Date, should read -- April 6, 2000 --

Column 7,
Lines 5 and 14, delete "damper" and insert -- clamper --;
Lines 18, 23 and 24, delete "damper" and insert -- clamper --;

Column 8,
Lines 4 and 30, delete "damper" and insert -- clamper --;
Lines 31 and 59, delete "damper" and insert -- clamper --.

Column 10,
Line 24, delete "damper" and insert -- clamper --.

Signed and Sealed this

Twenty-eighth Day of January, 2003

JAMES E. ROGAN
*Director of the United States Patent and Trademark Office*